United States Patent
Ylonen et al.

(10) Patent No.: US 7,302,487 B2
(45) Date of Patent: Nov. 27, 2007

(54) SECURITY SYSTEM FOR A DATA COMMUNICATIONS NETWORK

(75) Inventors: Tatu Ylonen, Espoo (FI); Tero Kivinen, Espoo (FI); Marko Teiste, Perttula (FI)

(73) Assignee: SafeNet, Inc., Belcamp, MD (US)

( * ) Notice: Subject to any disclaimer, the term of this patent is extended or adjusted under 35 U.S.C. 154(b) by 842 days.

(21) Appl. No.: 10/104,790

(22) Filed: Mar. 22, 2002

(65) Prior Publication Data

US 2002/0191548 A1    Dec. 19, 2002

(30) Foreign Application Priority Data

Mar. 22, 2001    (FI)    ................................. 20010596

(51) Int. Cl.
*G06F 15/16*    (2006.01)
(52) U.S. Cl. ...................... 709/229; 709/220; 709/221; 709/222; 713/185; 713/189
(58) Field of Classification Search ................ 709/229; 713/153, 201
See application file for complete search history.

(56) References Cited

U.S. PATENT DOCUMENTS

| | | | | | |
|---|---|---|---|---|---|
| 6,119,234 | A | * | 9/2000 | Aziz et al. | ................... 713/201 |
| 2002/0026503 | A1 | * | 2/2002 | Bendinelli et al. | .......... 709/220 |
| 2003/0018889 | A1 | * | 1/2003 | Burnett et al. | .............. 713/153 |

FOREIGN PATENT DOCUMENTS

WO    WO 0079738    * 12/2000

* cited by examiner

*Primary Examiner*—Yves Dalencourt
(74) *Attorney, Agent, or Firm*—Drinker Biddle & Reath

(57) ABSTRACT

A method is presented for setting up communication parameters in a virtual private network node for connecting to at least one other node in the virtual private network. The method may include reading information from a hardware token for determining how to connect to a packet data network; reading information from the hardware token for determining how to obtain configuration information for the virtual private network node; connecting to a packet data network on the basis of information read from the hardware token; obtaining configuration information for the virtual private network node on the basis of information read from the hardware token; and using obtained configuration information for setting up the communication parameters.

18 Claims, 6 Drawing Sheets

SECURITY SYSTEM FOR A DATA COMMUNICATIONS NETWORK

BACKGROUND OF THE INVENTION

1. Field of the Invention

The invention relates to systems and methods for implementing secured IP (internet protocol) networks. Especially, the invention is related to such a method as specified in the preamble of the independent method claim.

2. Description of Related Art

At least the following acronyms are used within this specification:

| | |
|---|---|
| BOOTP | bootstrap protocol [BOOTP] |
| DHCP | dynamic host configuration protocol [DHCP] |
| FW | Firewall |
| GPRS | general radio packet service |
| GSM | global service for mobile telecommunications |
| IETF | Internet Engineering Task Force |
| IP | Internet Protocol [IP] |
| IPSec | IP security protocol [IPSEC] |
| LAN | local area network |
| NAT | network address translation |
| PKI | public key infrastructure |
| RARP | reverse address resolution protocol [RARP] |
| SIM | subscriber identity module |
| TCP | transmission control protocol [TCP] |
| TFTP | trivial file transfer protocol [TFTP] |
| URL | uniform resource locator |
| VPN | Virtual Private Network |
| VRRP | Virtual Router Redundancy Protocol [VRRP] |
| WLAN | wireless local area network |

A firewall is a device, or more accurately a set of programs protecting resources of a private network or a computing devices from outside users. Firewalls are typically located between a private network of an organization and a public network. A firewall filters the traffic between the networks, allowing certain kinds of traffic to pass and rejecting other types of traffic. A set of rules known as firewall rules determine which types of traffic are allowed in which direction, and which types of traffic are rejected. For maximum security, a firewall is typically installed in a dedicated computer whose only duty is to act as the firewall. Also so called personal firewalls are known, which typically are programs or sets of programs installed on a user's workstation, for protecting the data and programs in that particular workstation against snooping or sabotage. Various examples of firewalls are given for example in the patent U.S. Pat. No. 5,826,014.

A virtual private network (VPN) is a network, which is formed on top of another, typically an untrusted public network by using secured connections between VPN nodes. Virtual private networks are gaining popularity, since a VPN allows the LANs of remote office s of an organization to be connected without requiring a dedicted cable connection between the offices. The LAN of each site is connected to a public network such as the Internet via a VPN node, and the VPN nodes manage the transmission of traffic between the LANs, taking care of encryption and authentication. Typically, a VPN node connecting a LAN to a public network also comprises firewall functionality. Various examples of VPNs are given for example in the document RFC 2764 [Gleeson]. Connections between the VPN nodes are typically encrypted and authenticated according to the IP security protocol.

The IP security protocol [IPSEC] is being standardized by the IETF (Internet Engineering Task Force) for adding security to the well-known and widely used IP protocol. It provides cryptographic authentication and confidentiality of traffic between two communicating network nodes. It can be used in both end-to-end mode, i.e. directly between the communicating nodes or hosts, or in tunnel mode between firewalls or VPN devices. Asymmetric connections, where one end is a host and the other end is a firewall or VPN are also possible.

Conventionally, the construction of a virtual private network (VPN) is a large project for an organization, requiring large efforts in planning and implementation of the VPN. Construction of a VPN according to solutions presented in the prior art require sophisticated professional skill, whereby most organizations need to employ expensive consultants for the project. In a typical case, VP N and firewall functionality is added to existing LANs, for example for connecting local networks of two offices of the organization via the Internet. Typical phases of such a project are the following:

collecting information of the present structure of the affected LANs,
specifying the needed functionality of the VPN and firewall,
planning the structure of the VPN and defining the firewall traffic control rules,
obtaining the necessary equipment and software,
installing and configuring the software,
setting up the equipment in a test environment,
testing the setup and correcting of possible errors,
moving the equipment to production locations,
connecting the equipment to the LANs and the internet,
performing the final test,
taking the VPN into full use.

As can be seen, such a project is complicated, and requires a relatively long time to implement. However, if the organization has several remote offices connecting to a central office, the setup needed at each remote office can be replicated relatively easy after the VPN equipment at the first remote office has been configured and tested—unless the LAN configurations and/or needed functionalities vary a great amount.

Maintenance of the VPN/firewall system is also a significant source of costs. Configuration of the system must be updated, if a new LAN is to be connected to an existing VPN, or for example if the selection of protocols passed through the firewall to the Internet and back is to be changed. Typically, such configuration changes require an on-site visit of a maintenance engineer. In order to maintain the security of the systems, the software in the VPN/firewall devices need to be periodically updated to cover any faults and holes, which could be abused by malicious or spying third parties. A software update typically requires a visit by a maintenance engineer to update the software on site.

The maintenance is typically a large expense in the long run, and when combined with the expenses related to setting up of the systems in the beginning, these work related costs typically far exceed the costs of the needed equipment. More easily deployable and manageable systems are clearly needed.

Explosive growth of the Internet has strongly increased the importance of making networking equipment easier to install and manage. This is particularly true when implementing security services, such as virtual private networks, on the networks. VPNs involve routing, data encryption, public key infrastructure (PKI), data encryption, network address translation, firewalls, and many other complicated data communications and security technologies. It has become extremely difficult to find enough technical expert skilled in all these areas to configure and build such networks.

Traditionally, single networking devices have been configured using a command-line configuration method from a console port (for example, Cisco routers). Often, the command-line method is used to enable a networking port, and rest of the configuration is then performed by connecting to the networking device from a remotely located management center.

Some known devices permit configuration using a web browser. In this case, the user connects to the device through the network using the Transmission Control Protcol/Intern et Protocol (TCP/IP). Prior art includes devices that are factory-configured to use a pre-defined IP address, as well as devices that will respond to any IP address in the factory configuration. Some wireless LAN access devices will respond to any web-based requests even if the user has not already been authenticated.

There are also devices which are managed through a local area network using protocols that operate in a single ethernet network. For example, HP Color Laserjet printers can be configured using HP's management software from any Windows-based workstation connected to the local network.

Trivial File Transfer Protocol (TFTP), together with Reverse Address Resolution Protocol (RARP), BOOTP, and/or Dynamic Host Configuration Protocol (DHCP) are also used to configure devices. In these systems, the device first obtains an IP address from the network, and then obtains its own configuration information using e.g. DHCP or TFTP. Examples of this kind of devices include diskless Sun Workstations in 1980's, diskless PC workstations, Windows workstations that obtain their IP address and other configuration information from DHCP. Cisco routers can also fetch their configuration file using TFTP from a configured server.

There is some prior art on configuring devices using smartcards. For example, the GSM SIM card contains the subscribers identity number and a cryptographic key for authentication. The SIM card also contains computational logic for executing an authentication an key generation algorithm on the SIM card, avoiding the need to transfer the secret key out from the card. The SIM card is used to authenticate the phone into the GSM network to allow communication. In GPRS, the GSM Packet Radio Systems, each phone can have an IP address. The GSM terminal (cellular phone) uses the SIM card to authenticate itself to the network, and obtains an IP address from the network.

Mobile IP defines a framework for an IP-based registration mechanism, whereby a mobile node can obtain information about foreign agents, can register to a foreign agent, and can obtain limited configuration information, such as a care-of-address from the foreign agent. There is also an authentication mechanism for Mobile IP proposed by Nokia that is based on using GSM SIM cards for authentication.

Security-aware devices for the Internet usually implement IPSEC and PKI functionality. These devices need to be configured with sensitive key material. The addition of security greatly complicates the installation of the network. Security-aware devices usually also need reasonably accurate time information in order to verify timeliness of security credentials such as certificates or digital signatures presented by other network nodes. Furthermore, the whole installation process must be secured, so that an attacker cannot compromise the network at any time. For example power outages are relatively easy to cause maliciously, and a method that can be compromised by causing a short power outage is not acceptable.

VPN devices are usually configured like routers. Typically, a serial port (console port) is used to perform the initial configuration. Some devices can be configured through a web interface.

Usually, after initial configuration networking devices are connected to a management system. The management system can then modify the configuration of the devices, and may in some cases even be able to upgrade the software of the networking device.

The prior art methods suffer from several problems:

they typically do not work if the networking device is separated from the management system by a NAT (Network Address Translation) device or by a firewall, they usually require that initial configuration is performed manually, and the communication between the network device and the management system is typically not properly secured.

SUMMARY OF THE INVENTION

An object of the invention is to realize a system for providing security services in a data communications network, which is easy to install and maintain. A further object of the invention is to provide methods, which allow easy and simple management of security networks.

The objects are reached by arranging a network security device to obtain configuration information from a configuration information distribution entity and to configure itself according to obtained configuration information.

The invention provides methods for configuring virtual private network devices with minimal requirements for manual interaction. According to the invention, at least basic IP address information or an indication to use a dynamic address assignment protocol as well as an indication of how to obtain full configuration information are stored in a hardware token. A virtual private network device is configured by allowing the virtual private network device to read the information stored in the hardware token, obtain full configuration information for the device based on the information in the hardware token, and to configure itself according to obtained configuration information.

BRIEF DESCRIPTION OF THE DRAWING

Various embodiments of the invention will be described in detail below, by way of example only, with reference to the accompanying drawings, of which

Same reference numerals are used for similar entities in the figures.

DETAILED DESCRIPTION OF THE PREFERRED EMBODIMENTS

Figure 1:
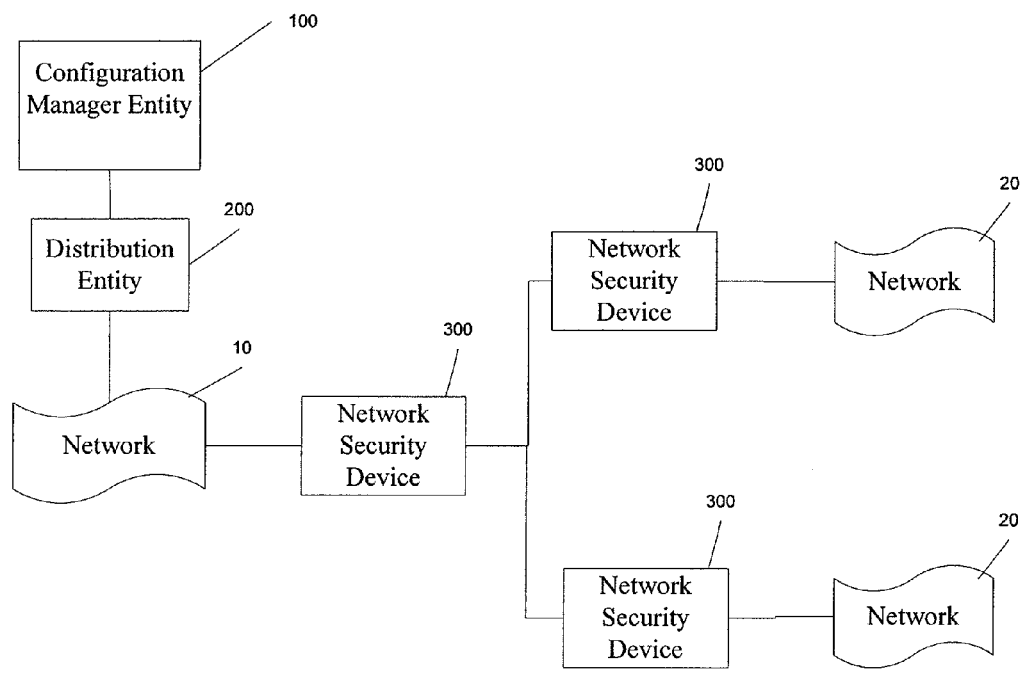
FIG. 1 illustrates a system according to an aspect of the invention.

The exemplary embodiments of the invention presented in this description are not to be interpreted to pose limitations to the applicability of the appended claims. The verb "to comprise" is used as an open limitation that does not exclude the existence of also unrecited features. The features recited in depending claims are mutually freely combinable unless otherwise explicitly stated.

A Network Device According to an Aspect of the Invention

In this section, an example of a network device according to an aspect of the invention is described. The purpose of the network device is to provide at least IPSec services for certain other network devices.

The network device comprises a processor, non-volatile memory such as flash memory, read-write memory (RAM), at least two network interfaces, and a hardware token reader such as a smartcard reader. Advantageously, the device has three network interfaces, which would allow the device to connect to a LAN and an external network as well as to other network devices sharing the traffic load at the installation location. Advantageously, the device also comprises special hardware for accelerating cryptographic operations such as a FPGA or a special cryptographic chip. The device comprises operating system software and application software for providing the desired services in the non-volatile memory. Before installation at a specific site for providing specific services at that site, the network device does not comprise a specific configuration for the site. For configuration purposes, the network device comprises software for obtaining configuration data on the basis of information in a hardware token connectable to the device and for configuring the device according to obtained configuration data. Therefore, such a network device can be manufactured in large numbers, and any such device can be taken to a particular site for installation. After insertion of a smartcard or other hardware token the device adapts to the topology of the installation site and the functional requirements by obtaining configuration data and configuring itself. Further, the device advantageously checks periodically if its configuration should be updated, and updates its configuration automatically if a configuration change is needed. Such an approach allows a very easy installation of the device without expert personnel at the installation site, and a very easy maintaining and updating of the network configuration at the installation site without any expert personnel at that site.

Preferably, a hardware token such as a smart card removably attachable to the network device using the hardware token reader of the network device contains at least the following information:

a private key for the network device for authentication purposes, a certificate or a public key corresponding to the private key, certificate of a management system allowed to control the network device in order to allow the network device to authenticate any messages from the management system, network address of a distribution node of the management system, and network interface parameters for the device such as IP address, netmask and default gateway address, or alternatively an indication to obtain them dynamically from the local network services by using for example the DHCP protocol.

The distribution node can advantageously be a HTTP server, which allows the network device to communicate with the distribution node using the HTTP protocol. Other protocols can also be used. For example, the communication can also be effected connectionlessly using a protocol on top of the UDP protocol.

The hardware token can be any smartcard, for example a smartcard according to the ISO 7816 standard. The data may be stored on the smartcard using e.g. PKCS-15 formats. As a man skilled in the art knows, many other data storage formats and exact contents are possible, and the smartcard may also contain other data.

When powered on, the device reads the initial configuration information from the smartcard. If the configuration information on the smartcard includes the IP address, netmask, and default gateway, the device configures one of its network interfaces with that information. Otherwises it uses e.g. the DHCP protocol to obtain similar information for the interface from the local network.

The device then connects to the network address of the distribution node of the management system and retrieves its configuration information. Preferably, the network device performs this using the GET method of the HTTP protocol [HTTP]. Other ways are also possible as a man skilled in the art, such as the use of the FTP protocol [FTP]. The network device can also use other protocols as well, such as the SOCKS protocol [SOCKS] to get through firewalls.

For confirming the authenticity of the configuration information stored on the distribution node, the configuration information is digitally signed. Therefore, in an advantageous embodiment of the invention, the configuration information comprises at least the actual configuration data and a digital signature of the data created with the private key of the management system which produced the configuration data. The configuration data may also include a certificate chain for the key. The device then verifies the signature using the certificate of the management system that was stored on the hardware token.

The configuration information may also comprise any IPSec configuration information, as w ell as other type of configuration information, such as for example configuration information regarding QoS (quality of service) functionality, routing, firewall functionality, or anti-virus functionality.

In a further advantageous embodiment of the invention, the configuration data stored at the distribution node is also encrypted by the management system using the public key of the network device. This allows only the network node itself to access the data, even if third parties could gain access to the encrypted file on the distribution point.

Instead of certificates and digital signatures, shared secrets and hash functions could equally well be used for authentication, as could any other known method for ensuring the integrity of data retrieved from a server (e.g., by using the SSL protocol).

Once the signature has been verified, the network device configures itself fully using the obtained configuration data. The full configuration can comprise many different phases and method steps depending on the particular requirements at the installation site. As examples, possible configuration steps are presented here:

Depending on the configuration data, it may designate one of the interfaces for communicating with other network devices in a group of network devices. This allows the installation of a plurality of network devices to share the load in order to provide higher capacity and/or higher availability than what is possible with a single network device.

The device advantageously also checks whether it has been configured to automatically initiate a secure tunnel to some other hosts. If that is the case, it initiates a key negotiation (e.g., IPSEC IKE negotiation) with those hosts to open such tunnels. Advantageously, if a secure tunnel which has been configured to be kept open becomes irresponsive at some point in time, the device automatically attempts to re-establish the tunnel periodically.

In a further advantageous embodiment of the invention, the network device polls periodically the network ad dress of the distribution node of the management system to see if its configuration data has changed. If it has, it retrieves new configuration data, and repeats the configuration process. The new configuration data may also be processed in an incremental fashion, so that only those parts of the device configuration are updated that have actually changed.

In a still further advantageous embodiment of the invention, the network device is arranged to send information to the management system, for example to the distribution point or some other network address specified in the full configuration information. This can be performed using the the POST method of the HTTP protocol. Examples of such information are for example status information about the network device and its activities as well as statistical data for example about the traffic passed through the network device.

In an even further advantageous embodiment of the invention, the network device is arranged to respond to SNMP protocol [SNMP] requests for allowing conventional network management and monitoring functions to access the network device. Advantageously, the network device allows only read requests, so that only the network management system dedicated to control the inventive network devices can affect the configuration of the network devices, and other tools based on SNMP could only monitor the configuration and/or collect information about traffic such as statistics information. Further, the network device may also be configured to send SNM P traps to a designated address periodically to report its status to another management system such as HP OpenView.

In a further advantageous embodiment of the invention the device is arranged to report status and/or statistics data to a distribution node or another device, using a protocol that works over NAT, such as HTTP or TCP/IP. The protocol can also be a UDP-based protocol with proper keepalive mechanisms to avoid UDP mappings from expiring from NAT devices.

In a further advantageous embodiment of the invention the device is arranged to report information about discovered NAT devices to the distribution node or another device.

In a further advantageous embodiment of the invention the device is arranged to obtain the current date and time from the distribution node or another device.

In a further advantageous embodiment of the invention the network device is arranged to request and receive a digital certificate for the network device. The network device may also be arranged to request and receive a digital certificate for renewing a certificate of the network device.

In a further advantageous embodiment of the invention the device is arranged to obtain a dynamic IP address at the installation site for example using the DHCP or PPP protocol. In such a case, the configuration information advantageously comprises information about which nodes the network device should automatically open an IPSEC tunnel with, so that those nodes can communicate securely with nodes behind the network device even tho ugh the network device does not have a static IP address. Advantageously, the network device is arranged to report its obtained IP address to the distribution node or another part of the management system.

In certain advantageous embodiments, the network device comprises functionality for cooperating with other network devices in a group of network devices for providing high availability and/or high capacity and/or device replication. In such embodiments, the configuration data advantageously includes information about whether the device is to support these functions or not. Advantageously, the device comprises means for sending a probe message to some or all of its communication interfaces and means for determining whether other network devices are connected to those interfaces in order to support high capacity, high availability and/or replication. Advantageously, configuration information in the hardware token or obtained from the distribution node comprises a secret key used by members of a network device group to establish secure communication among themselves. Advantageously, the network device comprises means for periodically reporting to the distribution node or another device about the status of other network devices in the group of network devices. Advantageously, the network device comprises means for monitoring the status of other members in the same group of network devices, and automatically reconfiguring the tasks of the remaining network devices if one of the network devices becomes inoperative.

In a further advantageous embodiment of the invention, the network device is arranged to repeatedly receive further configuration information. Advantageously, the network device comprises means to request further configuration information and/or means for checking if further configuration information is available. Advantageously, the network devices comprises functionality to receive notifications of configuration changes and means for retrieving new configuration information as a response to a received notification of a configuration change. Notifications can be carried from the management system to the network device for example using SNMP, IP multicast, HTTP, or any other communication mechanism that can be used to transmit information from the management system to the network device.

In a further advantageous embodiment of the invention, the network device is arranged to receive operating system updates from a distribution node.

In a further advantageous embodiment of the invention, the network device is arranged to receive anti-virus database updates from a distribution node.

In some circumstances such as when the number of possible variations of configuration data is small enough to allow all possible variations of configuration data to be stored on the network devices, transmission of full configuration data from the distribution node to the network device can be effected by transmitting a hash of the data, and then selecting the correct set of configuration data on the basis of the hash.

A Method According to an Aspect of the Invention

In this section, a method according to an aspect of the invention is discussed. The method comprises the following basic steps performed by a network device being installed at an installation location:

Accessing initial configuration information from a secure storage device where the configuration information comprises, at least the network address of an entity from which further configuration information can be obtained. The entity is advantageously the net work location of a part of a management system such as a configuration distribution node. The secure storage device can be for example a smartcard or some other hardware token. The secure storage device is advantageously separably attached to the network devices, but can also be fixedly attached to the network device. The network address can be for example an IP address or an URL.

connecting to said entity using a connection method, for example the HTTP protocol, that allows operation through NAT and/or firewalls.

using initial configuration information to obtain further configuration information from said entity.

ensuring the authenticity of further configuration information using key material stored in the secure storage device.

using said further configuration information to configure packet filtering functionality in the networking device.

using said further configuration information to configure the processing of IP packets according to the IPSEC protocol in the networking device.

repeatedly receiving updated configuration information from said entity or another entity indicated by said further and/or later updated configuration information, ensuring the authenticity of received updated configuration information using key material stored in the secure storage device. The network device can also initiate the transmission of configuration information by sending a request, such as a HTTP GET message to said entity. The network device can also merely wait for such transmissions without sending of explicit requests.

Advantageously, the network device performing the method is an IP VPN device that uses the IPSEC and IKE protocols and X.509 certificates.

Advantageously, the secure storage device is a smartcard. The secure storage device preferably also comprises an encryption and/or authentication key for the network device, authentication information (such as encryption/authentication key or certificate) for the management system allowed to change the configuration of the network device, and the network address of the management system.

In an advantageous embodiment of the invention, the network device comprises means for receiving initial configuration information into the secure storage device via a radio link. The radio link can be for example a Bluetooth radio link or a WLAN link. In a further advantageous embodiment of the invention, the network device comprises means for receiving initial configuration information into the secure storage device via a network interface. In a further advantageous embodiment of the invention, the network device comprises means for receiving initial configuration information into the secure storage device via a serial port interface.

In an advantageous embodiment of the invention, the method used as a connection method to connect the network device to said entity is IPSec with support for traversing a NAT function. In a still further advantageous embodiment of the invention, the method used as a connection method to connect the network device to said entity is the COPS protocol used on top of a TCP/IP connection. In an even further advantageous embodiment of the invention, the method used as a connection method to connect the network device to said entity is TCP/IP, with IETF specified policy information format data transmitted over the connection.

In an advantageous embodiment of the invention, said further configuration information comprises at least one or more of the following:
PKI configuration information,
identities and/or network addresses of certificate authorities,
network addresses of OCSP (Online Certificate Status Protocol) servers,
network addresses of LDAP servers
network addresses of Certificate Revocation List (CRL) distribution points,
allowed subjectnames,
required certificate extensions, and other PKI configuration information.

Advantageously, the integrity and/or confidentiality of the configuration information transmitted between said entity and the network device are protected. This can be accomplished by digitally signing and/or encrypting the configuration data, whereby the method comprises the step of verifying the signature, and/or the step of decrypting the configuration data. In a further advantageous embodiment of the invention, the connection method used between said entity and the network device is cryptographically protected, i.e. authenticated and/or encrypted. Such functionality can be obtained for example by using IPSec as the connection method.

In a further advantageous embodiment of the invention, said further configuration information comprises a list of devices with whom the network device should actively open an IPSec connection without waiting for traffic. This functionality allows those devices to send encrypted traffic to the network device even if the network device is hidden behind a NAT device.

The further configuration information can also comprise information about which secure connections go through a NAT device. In a further advantageous embodiments of the invention, the network device has means for automatically discovering which secure connections go through a NAT device.

The further configuration information may also comprise a network address to which the device should send SNMP traps to report its status. Such functionality allows SNMP based network monitoring systems to receive information from the network device.

A System According to an Aspect of the Invention

In this section, an example of a system according to an aspect of the invention is described with reference to FIG. 1. The system provides security services for certain parts of a data communication network. The system comprises at least a configuration manager entity 100, a distribution entity 200, and at least one network security device 300. The network security device is used to connect parts of the data connection network 10, 20 to each other, and to provide IPSec, firewall, and/or other functionality as needed. Networks 20 illustrate local area networks for example at certain office locations of a business, and network 10 illustrates a public data communications network such as the Internet. The configuration manager entity is used to define and change configurations for one or more network devices, and the distribution entity is used to store defined configurations of network devices and distribute these to the network security devices.

The configuration manager entity can also be used to produce information for inclusion in hardware tokens for network security devices. Advantageously, the configuration manager entity either comprises or is connected to a hardware token writer, whereby the network administrator controlling the network can create the hardware tokens for the network devices. After a network configuration is first created using the configuration manager entity, one hardware token is created for each network security device. Consequently, the network security devices are installed in the data communication network, each hardware token is attached to a corresponding network security device, and the network security device is powered on, whereafter the network security device configures itself as described elsewhere in this specification and begins serving the data communications network.

When a network security device is first installed and powered on, it attempts to obtain full configuration information from the distribution entity based on initial configuration information present in the hardware token associated with the network security device. If the distribution entity has the configuration information, it sends the information to the network security device. If the distribution entity does not have the configuration information, it obtains the configuration information from the configuration manager entity. If the transmission of the configuration information to the network security device fails, the distribution entity sends a configuration update notification to the network security device, which responds by rerequesting the configuration information. After obtaining the configuration information, the network security device configures itself as described elsewhere in this specification and begins serving the data communications network.

In the following, the procedures in the case of a configuration update are briefly described. Let us assume that a network administrator has completed an configuration update. The configuration manager entity notifies the distribution entity, which receives or fetches at least the changed configuration information from the configuration manager. Then the configuration manager sends a configuration update notification to those network security devices whose configuration has changed, which respond by rerequesting the configuration information. After obtaining the configuration information, the network security devices configure themselves as described elsewhere in this specification and continue serving the data communications network.

Advantageously, the distribution entity stores the configuration information units in encrypted form, so that each configuration information unit can only be read by the network security device, for which that particular configuration information unit is intended. Advantageously, the configuration manager entity performs the encryption, so that the distribution entity has no access to unencrypted configuration information. Advantageously, only the distribution entity can be accessed by nodes requesting configuration information. This configuration allows the placement of the distribution entity in a network zone having a relatively low security level, and the configuration manager can be retained in a network zone having a very high security level.

The inventive configuration allows many options in placement and control of the configuration manager entity and the distribution entity. For example, the configuration manager entity can be located in the headquarters of the company, whose office networks 20 are connected by the system, whereby the technical administration personnel of the company take care of maintaining the system. The configuration manager entity can also be controlled by a network provider, which is selling the security services as a service to the business. Further, the configuration manager entity can also be controlled by a consultant third party. The latter two examples illustrate situations, where the company itself does not need to have expert network security technicians of its own to install and maintain the security system. This is a large advantage, since network security experts are scarce and expensive. In comparison, the prior art solutions require considerable on-site work time by a network security expert for installation and maintenance.

We note that although many of the previous examples of various embodiments of the invention have described a distribution entity to be located in a different computer node as a management entity, the invention is not limited to such an arrangement. As a man skilled in the art knows, functionalities implemented in software can be located in many different ways in a network of computer nodes. For example, a distribution entity can be located in the same computer node as a management entity. As a further example, a management entity can also serve as a distribution entity, if there is no specific need to have the distribution entity in a separate computer node. For large networks, it may very well be advantageous to have the distribution in another node as the management entity. For small networks the desire for simplicity may dictate otherwise.

Further Advantageous Embodiments of the Invention

In a further advantageous embodiment of the invention, the configuration management entity is implemented in the same device as a VPN gateway entity. In this particular embodiment, the device has a VPN gateway operating mode and a configuration management mode. In the configuration management mode, the device can be used to define the structure of a VPN network, create key pairs for other security devices, create information for storing in hardware tokens for use by other security devices, and writing created information in hardware tokens. In this embodiment, a separate dedicated management workstation is not needed for managing and configuration of the VPN network, as all tasks performed by a management node can be handled with one of the security devices themselves. Advantageously, the operating mode of such a device is controlled by an arrangement requiring local physical access to the device by the operating person, such as by using a switch or for example by whether or not a hardware token is inserted in a hardware token reader of the device when the device is powered on.

In addition to not requiring a dedicated management workstation, a key advantage in such an arrangement is that it is extremely easy to deploy even by persons who are not fully qualified experts in networking technology. Such an arrangement allows the controls of the device to be extremely simple. For example, the physical controls of the device can be so simple as an on/off switch, two or more network connections, and a hardware token reader. If the device is switched on with a configured token in the hardware token reader, the device assumes the duties of a security device as dictated by configuration information on the hardware token. If the device is switched on without a configured token in the hardware token reader, the device assumes the duties of a configuration management node, which can then be used to define properties of a VPN, create keys for all security nodes, and to input key and configuration information into hardware tokens. In the configuration management mode, the device advantageously provides a control interface via one of its network ports accessible with commonly available tools such as a web browser. Consequently, in order to configure the network, a user simply connects a computer to a network port of the device, switches the device on without a hardware token in the hardware token reader, and accesses the configuration interface of the device using for example a web browser. In such an example, the configuration interface in the device could be implemented by software modules able to receive queries and to present web pages to the user's browser software.

In a further advantageous embodiment of the invention, a security device is arranged to function also as a configuration distribution node while in gateway operating mode. In this embodiment, the security device provides full configuration information data sets to other security devices. During configuration of a secured network, the security device (i.e. one of the security devices chosen to be used as a configuration management node) is used in configuration management mode. As described previously, the configuration results in configuration information for all security nodes. This configuration information is stored in a memory module in the security device, for example in a flash memory bank, on a hard disk, or in some other type of memory module. When the security node is used in gateway mode, the security node answers to requests for configuration information from other security devices by sending configuration information stored in the memory module corresponding to the requesting security device. In an advantageous embodiment of the invention, such a security device comprises at least computer software code means for generating configuration information for security devices, computer software code means for writing configuration information in a hardware token, computer software code means for encrypting a set of configuration information using a public key, computer software code means for digitally signing a set of configuration information, computer software code means for storing a set of configuration information in the memory module, and computer software code means for receiving a request for configuration information and for sending a stored set of configuration information as a response to receiving said request.

In a further advantageous embodiment of the information, configuration information comprises information about permitted communication peers. This information about permitted communication peers can be effected for example by using any of the following:

a list of allowed peers, identified by identifiers recognized by an IPSEC key management protocol, such as IKE, a list of public keys of nodes that are allowed to connect to or via the network device, a list of certificate authority certificates or public keys of certificate authorities, whereby nodes having a valid certificate from any of these certificate authorities are allowed to connect to or via the network device, and for example all nodes may be allowed to connect using a default policy.

In a further advantageous embodiment of the invention a method for repairing failed VPN devices is provided. The method comprises at least the following steps:

taking of a new device from storage, connecting network and power cables to the new device, moving the hardware token from failed device to the new device, powering the new device on, performing a configuration method according to an embodiment of the invention by the device.

In a further advantageous embodiment of the invention a method for repairing a failed VPN device in cases where the failure lies in a hardware token attached to the device is provided. The method comprises at least the following steps:

removing of failed hardware token, taking of a new hardware token from a secure storage location, attachment of the hardware token to the device, powering the device on, performing a configuration method according to an embodiment of the invention by the device.

Further Aspects of the Invention

Figure 2A:
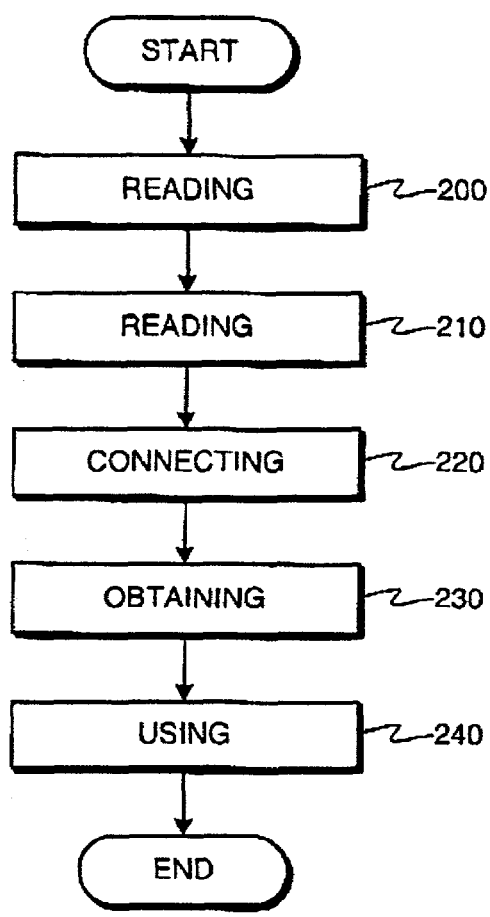
FIGS. 2a and 2b illustrate various methods according to different embodiments of the invention.

FIG. 2a illustrates a further advantageous embodiment of the invention. The embodiment provides a method for setting up communication parameters in a virtual private network node, for enabling the node to connect to at least one other node in the virtual private network. The method comprises at least the steps of reading 200 information from a hardware token for determining how to connect to a packet data network, reading 210 information from the hardware token for determining how to obtain configuration information for the virtual private network node, connecting 220 to a packet data network on the basis of information read from the hardware token, obtaining 230 configuration information for the virtual private network node on the basis of information read from the hardware token, and using 240 obtained configuration information for setting up the communication parameters.

The information for determining how to connect to a packet data network can for example comprise IP address, network mask, and default gateway information for the virtual private network node in order to allow the node to communicate with a packet data network. The information can also comprise an indication that the virtual private network node shall obtain an IP address and basic routing information dynamically, for example using the DHCP protocol.

The configuration information can be obtained in a variety of ways. For example, the information in the hardware token can indicate directly a network address from which to obtain the configuration information. The network address can be an IP address, or in the form of an URL (Uniform Resource Locator). The information can also specify an identifier with which to indicate to the computer node answering requests sent to the specified network address, which configuration data set to send back as a response to the request.

In a further advantageous embodiment of the invention, the information in the hardware token can indicate an indirect way of obtaining the configuration information. For example, the information in the hardware token can comprise an indication of a service from where to request further network address and/or URL information for obtaining the configuration information, such as a network address and/or URL of such a service. Further, the information in the hardware token can comprise an identifier with which to obtain further network address and/or URL information for obtaining the configuration information.

Figure 2B:
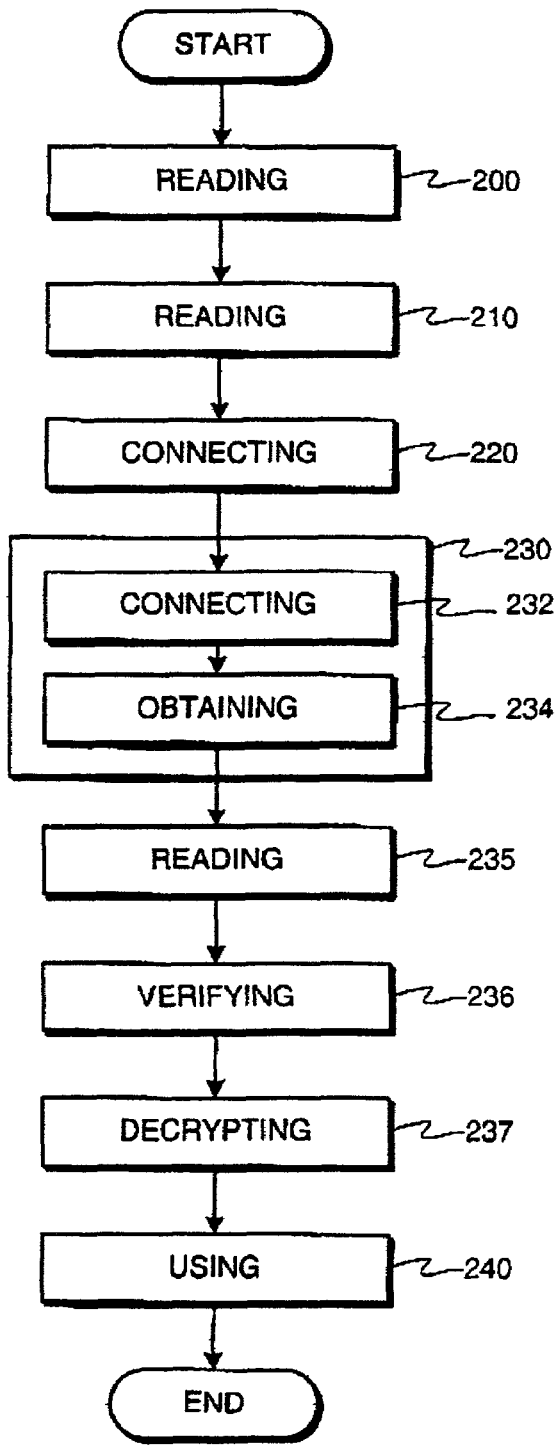

FIG. 2b illustrates a further advantageous embodiment of the invention. The steps 200, 210, 220, 230, and 240 are the same as in FIG. 2a, whereby their description is not repeated here. The embodiment of FIG. 2b further comprises the steps of making 232 a connection to a network address by said certain security node, obtaining 234 a set of information from the computer node responding to said connection to said network address, reading 235 a first security item from said hardware token, verifying 236 the authenticity of said set of information on the basis of said security item, and decrypting 237 said obtained set of information on the basis of a second security item stored in the hardware token.

The steps of verifying 236 and decrypting 237 can also be performed in the reverse order, depending on how the set of information was prepared by the entity that prepared the set of information.

The first security item can be for example a preshared key, a shared secret, or or for example a certificate. The second security item can for example be a secret key, a preshared key, or a shared secret. The first and second security items may in some applications be the same, which is feasible for example if the security item is a preshared key.

For security reasons, it is advantageous also to have a security item such as a key pair or a shared secret key in the hardware token. However, in certain embodiments of the invention, no security keys are stored in the hardware token. This means that the first contact from a remote security device to the entity which provides the full configuration information proceeds without authentication, which is a vulnerability in the security sense. Also the first message sent will be unencrypted due to lack of any encryption keys. However, an encrypted connection can be set up for example using the secure shell protocol, the TLS protocol, or some other encryption protocol which does not require a prior exchange of encryption keys i.e. which provides for negotiating an encryption key in the beginning of the connection. After startup of encryption, it will not be possible for malicious third parties to intercept and alter the messages any more. While such a vulnerability is not acceptable for high security applications, it may very well be acceptable in some situations and for some organizations.

FIG. 3 illustrates a method according to a further aspect of the invention. This aspect of the invention provides a method for setting up a secured communications network, which network comprises at least two security nodes connected to a packet data network. The method comprises at least the steps of producing 300 configuration information for the security nodes, storing 310 said produced configuration information, inserting 320 a part of configuration information corresponding to a certain security node into a certain hardware token, reading 330 of configuration information from said certain hardware token by said certain security node, obtaining 340 the rest of produced configuration information for said certain security node by said certain security node on the basis of data read from said certain hardware token, and setting 350 of communication parameters within said certain security node on the basis of said obtained configuration information.

In a further advantageous embodiment of the invention, at least a part of configuration information pertaining to a node is encrypted 302 using public key cryptography with the public key of the node. In particular, in this embodiment the method also comprises the step of encrypting at least a part of configuration information corresponding to said certain security node on the basis of a public key corresponding to a secret key caused to be stored in said certain hardware token corresponding to said certain security node.

In a further advantageous embodiment of the invention, the encryption 302 is performed using a shared secret, such as a preshared key. In particular, in this embodiment the method further comprises the step of encrypting at least a part of configuration information corresponding to said certain security node on the basis of a shared secret stored in said certain hardware token corresponding to said certain security node.

In a still further embodiment of the invention, produced configuration information is signed 304 digitally. The digital signing can be effected as well before as after the encryption step.

Depending on the desired security level of a particular application of the inventive method, the configuration information can be left unencrypted and unsigned, or the configuration information can be only signed or only encrypted.

In an advantageous embodiment, the configuration information is obtained using an authenticated connection. This embodiment is illustrated in FIG. 3b. In this embodiment of the invention, the method further comprises the steps of reading 332 a network address from said certain hardware token by said certain security node, reading 334 a first security item from said certain hardware token by said certain security node, and in said step of obtaining 340 the rest of produced configuration information, the steps of making 342 a connection to said network address by said certain security node, verifying 344 the identity of the computer node responding to said connection to said network address on the basis of said first security item, and confirming 346 the identity of said certain security node to said computer node on the basis of a second security item stored in said certain hardware token.

Figure 3A:
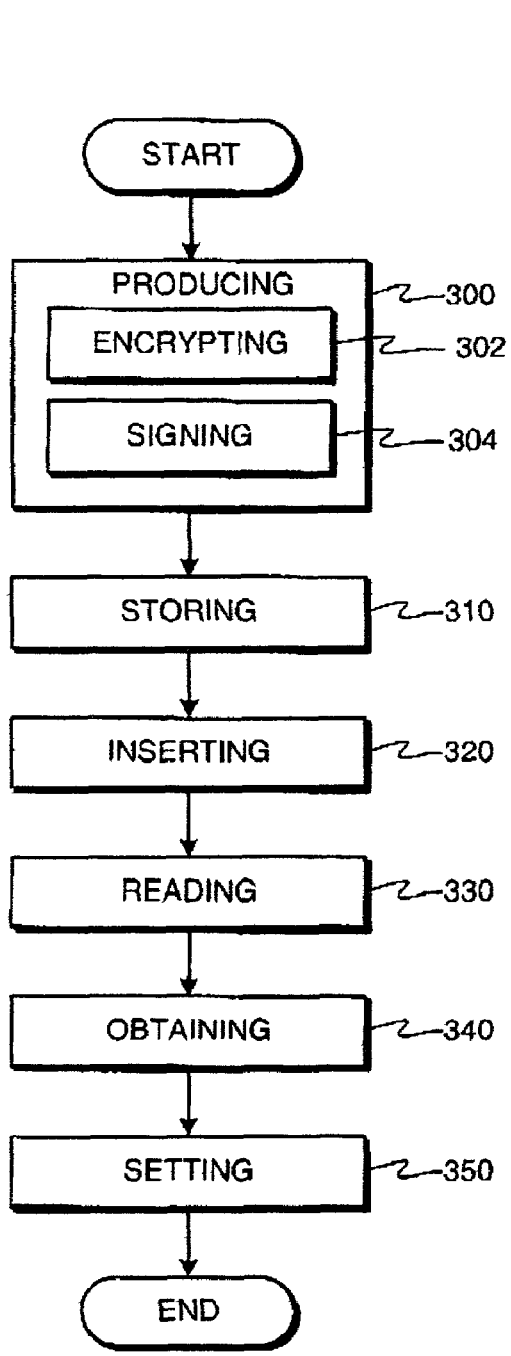
FIGS. 3a, 3b, and 3c illustrate further methods according to different embodiments of the invention.
Figure 3B:
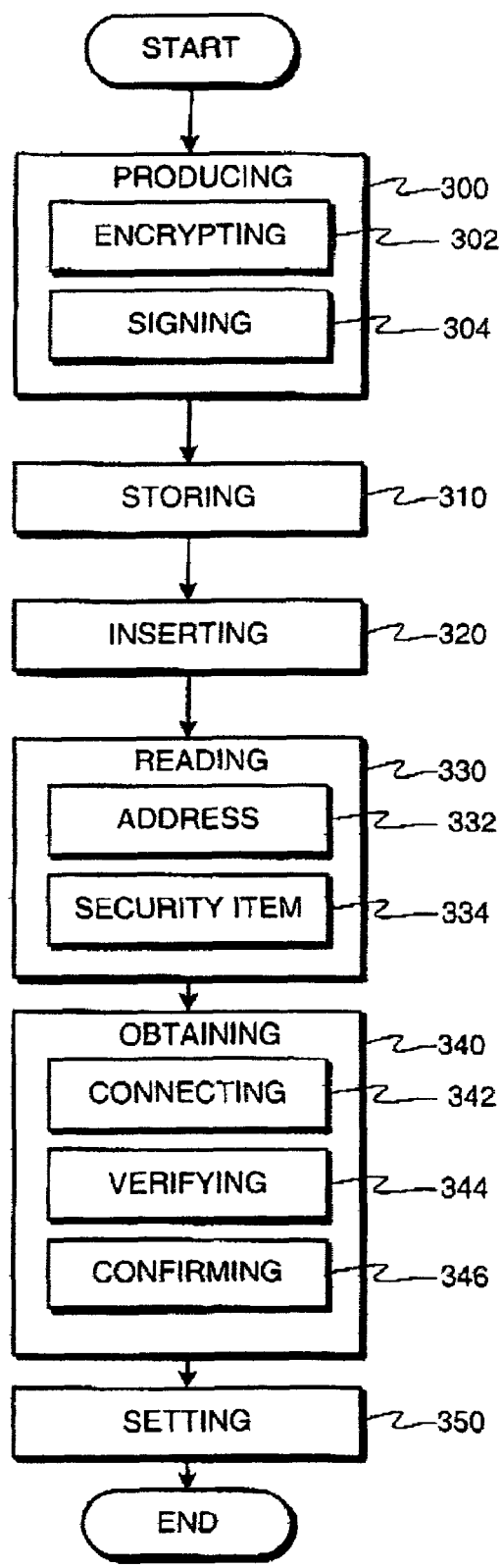

The other method steps illustrated in FIG. 3b are the same as in FIG. 3a, whereby their description is not repeated here.

The first security item can be for example a certificate, pre-shared key, or a shared secret. The second security item can be for example a secret key or a shared secret. If the first security item and the second security item are shared secrets, they can even be the same. The network address can be for example an IP address or an URL. The invention is not limited to the network address specifying a location from where to obtain configuration information. As described previously in this specification, the information read from the hardware token can comprise an indirect indication of the source of configuration information.

Figure 3C:
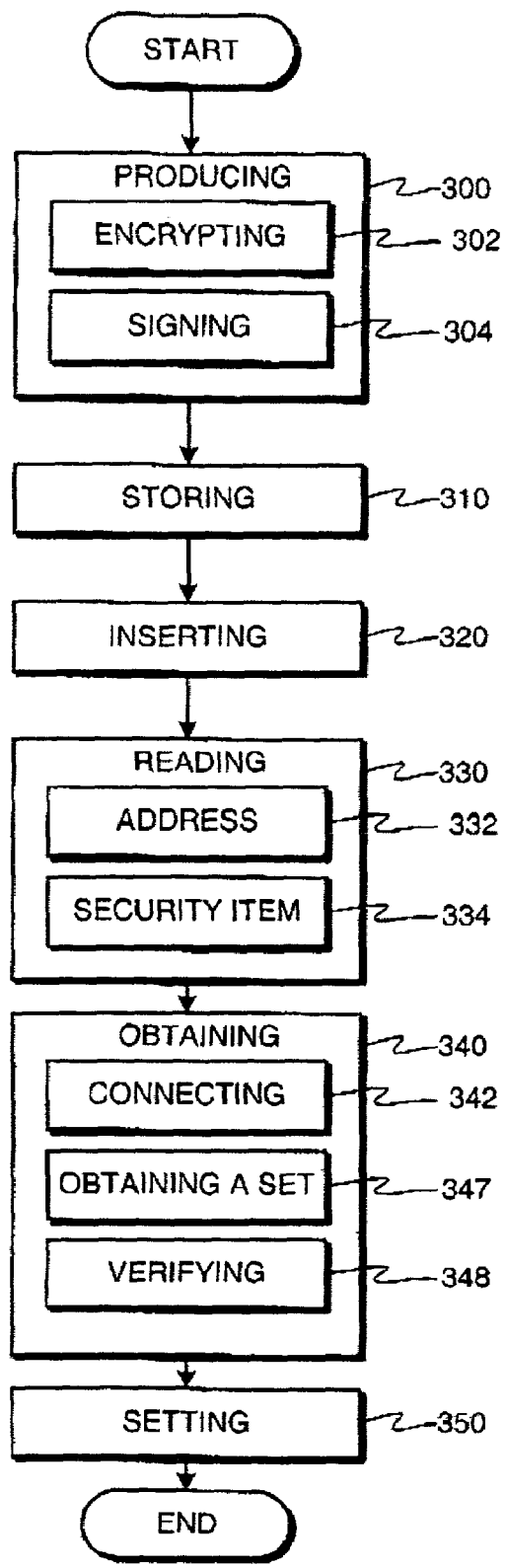

In a further advantageous embodiment of the invention, the connection which is used to obtain the configuration information is not authenticated, but t he retrieved configuration information is checked for authenticity before applying the configuration information. Such an embodiment is illustrated in FIG. 3c. In particular, in this embodiment the method further comprises the steps of reading 332 a network address from said certain hardware token by said certain security node, reading 334 a security item from said certain hardware token by said certain security node, and in said step of obtaining 340 the rest of produced configuration information, the steps of making 342 a connection to said network address by said certain security node, obtaining 347 a set of information from a computer node responding to said connection to said network address, and verifying 348 the authenticity of said set of information on the basis of said security item.

The other method steps illustrated in FIG. 3c are the same as in FIG. 3a, whereby their description is not repeated here.

The security item can be for example a certificate, a pre-shared key or a shared secret.

In a further advantageous embodiment of the invention the method further comprises the step of decrypting said obtained set of information by said certain security node on the basis of a security item stored in the hardware token for obtaining the rest of configuration information for said certain security node. This security item can be for example a secret key or a pre-shared key or a shared secret. In such an embodiment of the invention where the hardware token comprises a public and secret key pair, the set of information is advantageously encrypted using the public key, whereby the security node can decrypt the information using the secret key. However, the decryption key can be different from the key or key pair used to authenticate the node.

Figure 4A:
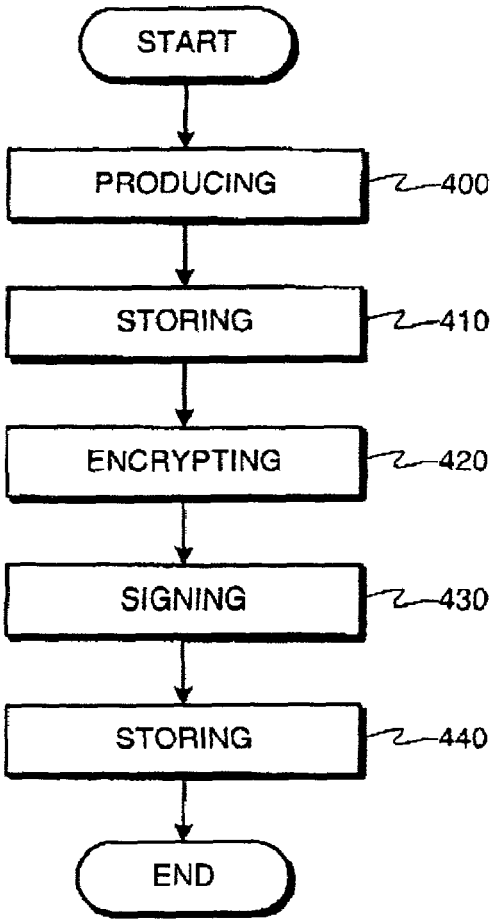
FIGS. 4a and 4b illustrate still further methods according to different embodiments of the invention.

According to a further aspect of the invention, a method for producing and distributing configuration data for a virtual private network is provided. Such an embodiment of the invention is illustrated in FIG. 4a. The virtual private network comprises at least two security nodes connected to a packet data network. The method comprises at least the steps of producing 400 configuration information for the security nodes; and for each security node for which configuration information was produced, storing 410 a part of said produced configuration information of the security node in a hardware token corresponding to the security node, encrypting 420 at least a part of configuration information corresponding to the security node, digitally signing 430 said at least a part of configuration information, and storing 440 said encrypted and digitally signed configuration information in a memory means accessible to a distribution entity.

In various further embodiments of the invention, the signing step 430 is performed before the encrypting step 420.

The distribution entity can be the same entity as the configuration management entity. It is possible that the virtual private network comprises also such security nodes for which configuration information is not generated in a management node, for example if configuration information is specified and entered manually into a computer node without help of the inventive configuration system. Therefore, the use of the invention does not block the use of security nodes which do not participate in the inventive activity.

Figure 4B:
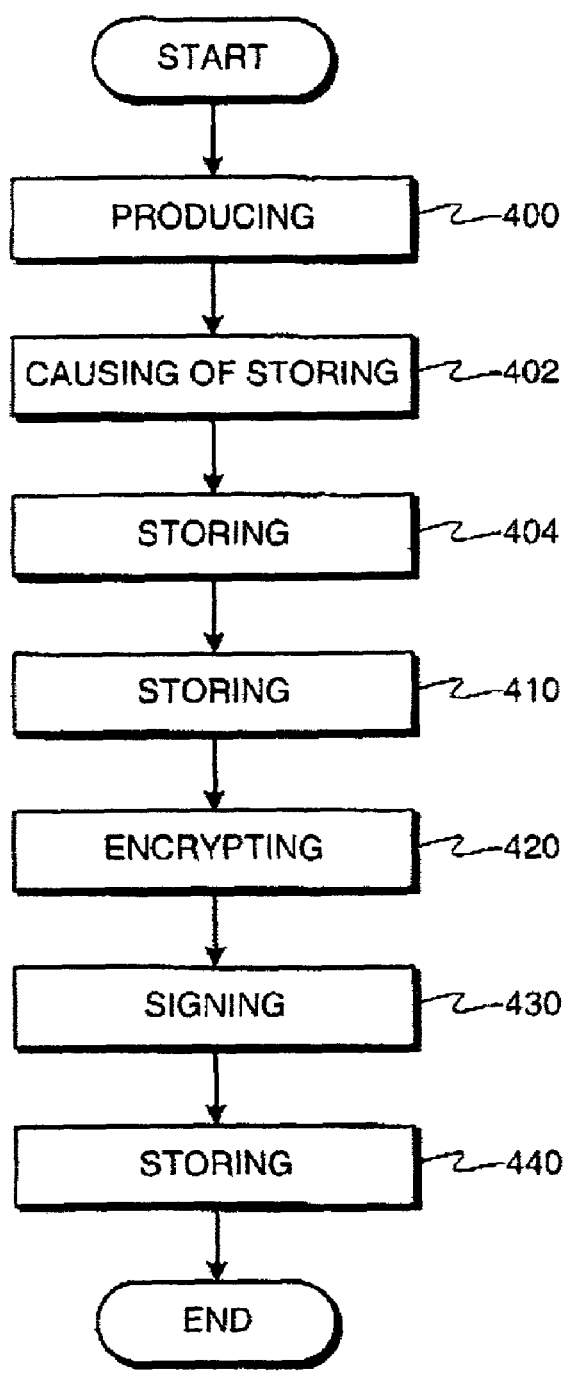

In a further advantageous embodiment of the invention, the method comprises also steps, in which hardware tokens are prepared for security nodes. Such an embodiment is illustrated in FIG. 4b. According to the embodiment, the method further comprises steps in which a public and secret key pair is caused 402 to be stored in the hardware token for use in authenticating the security node and for decryption of configuration information, and a certificate is stored 404 in the hardware token for authenticating the management entity and checking of the digital signature of the configuration data.

Other steps shown in FIG. 4b are the same as in FIG. 4a, whereby their description is not repeated here.

Figure 5:
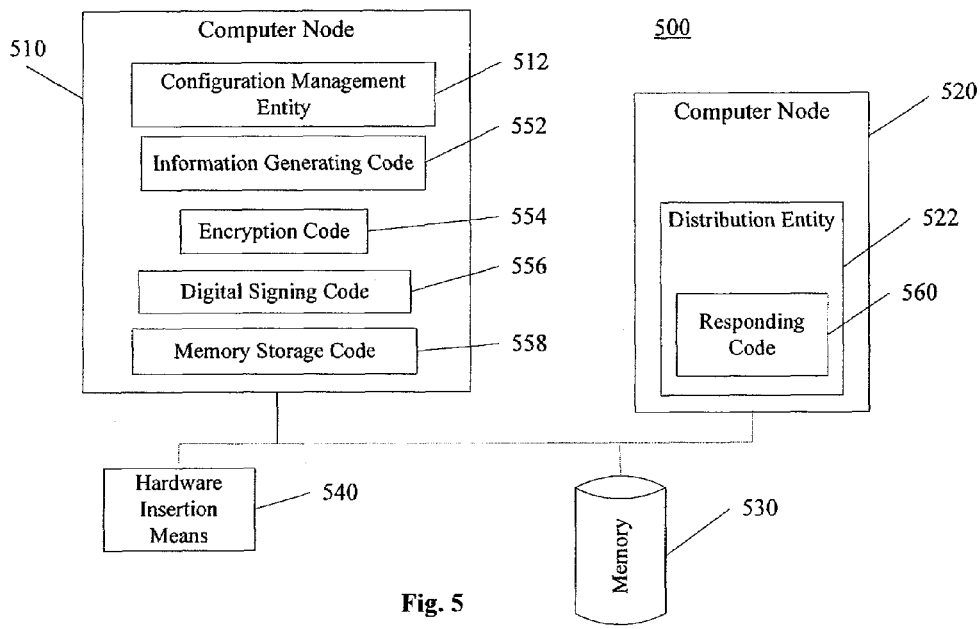
FIG. 5 illustrates a further system according to an advantageous embodiment of the invention.

According to a further aspect of the invention, a system 500 for managing configuration information of a secure communications network is provided, said secure communications network having a plurality of security nodes connected to a packet data network. Such a system is illustrated in FIG. 5. The system comprises at least a first computer node 510, a configuration management entity 512 in said first computer node, a second computer node 520, a distribution entity 522 in said second computer node, a memory means 530 accessible by said distribution entity, connected to said first computer node, means 540 for inserting information in a hardware token, computer software code means 552 for generating configuration information, computer software code means 554 for encrypting a set of configuration information, computer software code means 556 for digitally signing a set of configuration information, computer software code means 558 for causing a set of configuration information to be stored in said memory means, computer software code means 560 in said distribution entity for receiving a request for configuration information from a security node and for transmitting a set of configuration information as a response to receiving a request for configuration information.

The means 540 for inserting information in a hardware token can be a device for writing information into smart cards or other types of hardware tokens.

Although in FIG. 5 the distribution entity is illustrated to reside in a different computer node as the management entity, in other embodiments of the invention both entities can be located in the same computer device.

Figure 6:
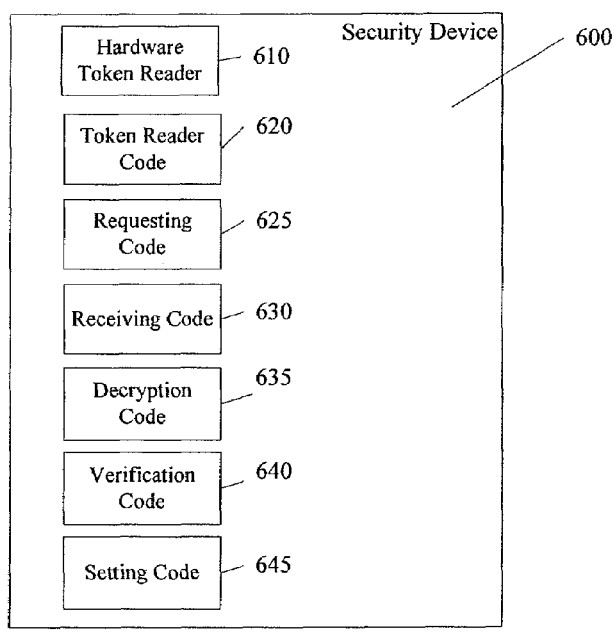
FIG. 6 illustrates a security device according to an advantageous embodiment of the invention.

According to a further aspect of the invention, a security device 600 for a secured communications network which is provided. Such a security device is illustrated in FIG. 6. The security device has at least two network interfaces, a memory module and a processor. The security device further comprises at least a hardware token reader 610 for connecting to a hardware token and for reading information from a hardware token, computer software code means 620 for reading information from a hardware token, computer software code means 625 for transmitting a request of configuration information to a network address, computer software code means 630 for receiving a set of configuration information, computer software code means 635 for decrypting a received set of configuration information, computer software code means 640 for verifying authenticity of a received set of configuration information on the basis of a security item obtained from a hardware token, and computer software code means 645 for setting of communication parameters on the basis of a received set of configuration information. The security item can be for example a certificate or a shared secret key.

Further Considerations

A secret key can be introduced into a hardware token in two basic ways: either by inputting a predefined secret key to the hardware token, or by causing the hardware token itself to compute a public and secret key pair and to store the computed keys within the hardware token. Both ways are known ways to insert a secret key into a hardware token. The latter way of having the hardware token itself compute the key pair has the advantage that the secret key never exists outside the hardware token, not even in the computer system used to otherwise initialise the hardware token and input information in it. Either of these ways can be used in various embodiments of the invention.

The type of the hardware token reader in a security device is naturally dependent on the type of hardware tokens intended to be used with the device. Many different types of hardware tokens exist at the time of writing of this patent application, and many different types of tokens can be expected to be developed in the future. The invention is not limited to use any specific type of hardware tokens. For example, the hardware token can be a smart card or for example a small device comprising a memory means and a USB connector. Preferably, for security reasons, the hardware token comprises a processor capable of performing public and secret key operations so that the hardware token can perform all operations where the secret key is needed so that the secret key does not need to exist outside the hardware token.

The invention is not limited to any particular type of network. For example, the invention can be implemented in IPv4 as well as IPv6 networks.

The invention has been described using some particular advantageous embodiments as examples. However, various implementations of the invention are not limited to the described examples, and the invention can be realized in many different ways within the scope of the attached patent claims.

REFERENCES

All RFC documents are available on the Internet for example from the Internet address http://www.ietf.org/rfc.html.

[BOOTP] RFC 951, "Bootstrap Protocol", W. J. Croft, J. Gilmore, Sep. 1, 1985.
[DHCP] RFC 2131 Dynamic Host Configuration Protocol. R. Droms. March 1997.
[FTP] RFC 959 File Transfer Protocol. J. Postel, J. K. Reynolds. Oct. 1, 1985.
[Gleeson] RFC 2764, "A Framework for IP Based Virtual Private Networks", B. Gleeson, A. Lin, J. Heinanen, G. Armitage, and A. Malis, February 2000.
[HTTP] RFC 2616 Hypertext Transfer Protocol—HTTP/1.1. R. Fielding, J. Gettys, J. Mogul, H. Frystyk, L. Masinter, P. Leach, T. Berners-Lee. June 1999.
[IP] RFC 791 Internet Protocol. J. Postel. Sep. 1, 1981.
[IPSEC] RFC 2401, "Security Architecture for the Internet Protocol", S. Kent and R. Atkinson, November 1998
[RARP] RFC 903 Reverse Address Resolution Protocol. R. Finlayson, T. Mann, J. C. Mogul, M. Theimer. Jun. 1, 1984.
[SOCKS] RFC 1928 SOCKS Protocol Version 5. M. Leech, M. Ganis, Y. Lee, R. Kuris, D. Koblas, L. Jones. April 1996.
[SNMP] RFC 1157 Simple Network Management Protocol (SNMP). J. D. Case, M. Fedor, M. L. Schoffstall, C. Davin. May 1, 1990.
[TCP] RFC 793 Transmission Control Protocol. J. Postel. Sep. 1, 1981.
[TFTP] RFC 1350 The TFTP Protocol (Revision 2). K. Sollins. July 1992.
[VRRP] RFC 2338 Virtual Router Redundancy Protocol. S. Knight, D. Weaver, D. Whipple, R. Hinden, D. Mitzel, P. Hunt, P. Higginson, M. Shand, A. Lindem. April 1998.

The invention claimed is:

1. Method for setting up a secured communications network, which network comprises at least two security nodes connected to a packet data network, comprising at least the steps of
producing configuration information for the security nodes,
encrypting at least a part of configuration information,
digitally signing said at least a part of configuration information,
storing said encrypted and digitally signed configuration information in a memory means accessible to a distribution entity
inserting a part of configuration information corresponding to at least one of said at least two security nodes into a certain hardware token,
storing a public and secret key pair in the hardware token for use in authenticating the security nodes and for decryption of configuration information,
storing a certificate in the hardware token for authenticating a management entity and checking of a digital signature of the configuration data,
reading of configuration information from said certain hardware token by said at least one security node,
obtaining the rest of produced configuration information for said at least one security node by said at least one security node on the basis of data read from said certain hardware token,
setting of communication parameters within said at least one security node on the basis of said obtained configuration information.

2. A method according to claim 1 further comprising the steps of
reading a network address from said certain hardware token by said at least one security node, and
reading a first security item from said certain hardware token by said at least one security node;
wherein said step of obtaining the rest of produced configuration information further includes:
making a connection to said network address by said at least one security node,
verifying the identity of the computer node responding to said connection to said network address on the basis of said first security item, and
confirming the identity of said at least one security node to said computer node on the basis of a second security item stored in said certain hardware token.

3. A method according to claim 1 further comprising the steps of
reading a network address from said certain hardware token by said at least one security node, and
reading a security item from said certain hardware token by said at least one security node; wherein said step of obtaining the rest of produced configuration information further includes:
making a connection to said network address by said at least one security node,
obtaining a set of information from a computer node responding to said connection to said network address, and
verifying the authenticity of said set of information on the basis of said security item.

4. A method according to claim 3 further comprising the step of decrypting said obtained set of information by said at least one security node on the basis of a security item stored in the hardware token for obtaining the rest of configuration information for said at least one security node.

5. A method according to claim 1 further comprising the step of encrypting at least a part of configuration information corresponding to said at least one security node on the basis of a public key corresponding to a secret key caused to be stored in said certain hardware token corresponding to said at least one security node.

6. A method according to claim 1 further comprising the step of encrypting at least a part of configuration information corresponding to said at least one security node on the basis of a shared secret stored in said certain hardware token corresponding to said at least one security node.

7. A method according to claim 1 further comprising the step of digitally signing said at least part of configuration information.

8. Method for producing and distributing configuration data for a virtual private network, which network comprises at least two security nodes connected to a packet data network, comprising at least the steps of
producing configuration information for the security nodes;
and for each security node for which configuration information was produced,
storing a part of said produced configuration information of the security node in a hardware token corresponding to the security node,
encrypting at least a part of configuration information corresponding to the security node,
storing a public and secret key pair in the hardware token for use in authenticating the security node and for decrypting of configuration information,
storing a certificate in the hardware token for authenticating a management entity and checking of the digital signature of configuration data.
digitally signing said at least a part of configuration information, and
storing said encrypted and digitally signed configuration information in a memory means accessible to a distribution entity.

9. A method according to claim 8 further comprising the steps of
reading information from a hardware token for determining how to connect to a packet data network,
reading information from the hardware token for determining how to obtain configuration information for the virtual private network node,
connecting to a packet data network on the basis of information read from the hardware token,
obtaining configuration information for the virtual private network node on the basis of information read from the hardware token,
using obtained configuration information for setting up the communication parameters.

10. Method according to claim 9 wherein said information for determining how to connect to a packet data network comprises IP address, network mask, and default gateway information for the virtual private network node.

11. Method according to claim 9 wherein said information for determining how to connect to a packet data network comprises an indication that the virtual private network node shall obtain an IP address and basic routing information dynamically.

12. Method according to claim 9 wherein said information for determining how to obtain configuration information for the virtual private network node comprises a network address from which to obtain the configuration information.

13. Method according to claim 9 wherein said information for determining how to obtain configuration information for the virtual private network node comprises an URL from which to obtain the configuration information.

14. Method according to claim 9 wherein said information for determining how to obtain configuration information for the virtual private network node comprises an indication of a service from where to request further network address and/or URL information for obtaining the configuration information.

15. Method according to claim 9 wherein said information for determining how to obtain configuration information for the virtual private network node comprises an identifier with which to obtain further network address and/or URL information for obtaining the configuration information.

16. Method according to claim 9 further comprising at least the steps of
making a connection to a network address by a certain security node,
obtaining a set of information from the computer node responding to said connection to said network address,
reading a first security item from said hardware token,
verifying the authenticity of said set of information on the basis of said first security item, and decrypting said obtained set of information on the basis of a second security item stored in the hardware token.

17. A system for managing configuration information of a secure communications network, said secure communications network having a plurality of security nodes connected to a packet data network, comprising at least
a first computer node,
a configuration management entity in said first computer node,
a second computer node,
a distribution entity in said second computer node,
a memory means accessible by said distribution entity,
connected to said first computer node, means for inserting information in a hardware token,
computer software code means for generating configuration information,
computer software code means for encrypting a set of configuration information,
computer software code means for digitally signing a set of configuration information,
computer software code means for causing a set of encrypted and digitally signed configuration information to be stored in said memory means,
computer software code means for causing a public and secret key pair to be stored in the hardware token for use in authenticating the security node and for decrypting of configuration information,
computer software code means for causing a certificate to be stored in the hardware token for authenticating a management entity and checking of the digital signature of configuration data, and
computer software code means in said distribution entity for receiving a request for configuration information from a security node and for transmitting a set of configuration information as a response to receiving a request for configuration information.

18. The system of claim 17 further comprising a security device for a secured communications network which security device has at least two network interfaces, a memory module and a processor, comprising at least:

a hardware token reader for connecting to a hardware token and for reading information from a hardware token, computer software code means for reading information from a hardware token, computer software code means for transmitting a request of configuration information to a network address, computer software code means for receiving a set of configuration information, computer software code means for decrypting a received set of configuration information, computer software code means for verifying authenticity of a received set of configuration information on the basis of the public and secret key pair and the certificate obtained from a hardware token, and computer software code means for setting of communication parameters on the basis of a received set of configuration information.

* * * * *